(12) United States Patent
Yasuda et al.

(10) Patent No.: US 8,081,360 B2
(45) Date of Patent: Dec. 20, 2011

(54) LIGHT-COLLECTING DEVICE, LIGHT-COLLECTING DEVICE ARRAY, EXPOSURE DEVICE AND IMAGE-FORMING APPARATUS

(75) Inventors: Shin Yasuda, Kanagawa (JP); Jiro Minabe, Kanagawa (JP); Katsunori Kawano, Kanagawa (JP); Yasuhiro Ogasawara, Kanagawa (JP); Kazuhiro Hayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 107 days.

(21) Appl. No.: 12/557,976

(22) Filed: Sep. 11, 2009

(65) Prior Publication Data
US 2010/0238531 A1 Sep. 23, 2010

(30) Foreign Application Priority Data
Mar. 18, 2009 (JP) ................ 2009-066067

(51) Int. Cl.
*G02B 5/32* (2006.01)
*G03H 1/30* (2006.01)
(52) U.S. Cl. ............ 359/15; 359/19; 359/25; 385/37
(58) Field of Classification Search ............... 359/15, 359/1, 22, 19, 28
See application file for complete search history.

(56) References Cited

U.S. PATENT DOCUMENTS

| | | | |
|---|---|---|---|
| 4,700,206 A | 10/1987 | Yamakawa | |
| 4,810,047 A * | 3/1989 | Pernick ............... | 359/19 |
| 7,167,286 B2 * | 1/2007 | Anderson et al. ............... | 359/25 |
| 7,649,660 B2 * | 1/2010 | Adibi et al. ............... | 359/15 |
| 2007/0147735 A1 * | 6/2007 | Kim ............... | 385/37 |

FOREIGN PATENT DOCUMENTS

| | | |
|---|---|---|
| JP | A-60-116479 | 6/1985 |
| JP | A-1-179237 | 7/1989 |
| JP | A-2002-139628 | 5/2002 |
| JP | A-2007-237576 | 9/2007 |

OTHER PUBLICATIONS

Jun. 14, 2011 Office Action issued in Japanese Patent Application No. 2009-066067 (with translation).

* cited by examiner

*Primary Examiner* — Audrey Y Chang
(74) *Attorney, Agent, or Firm* — Oliff & Berridge, PLC

(57) ABSTRACT

A light-collecting device is provided, a light-collecting device, including: a first volume hologram recorded in a hologram recording layer by interference of a first spherical wave and a planar wave, the first spherical wave passing through a light path of diffused light which radiates from a light incident point, passes through the hologram recording layer and spreads to a predetermined diameter; and a second volume hologram recorded in the hologram recording layer by interference of a second spherical wave and the planar wave, the second spherical wave passing through a light path of converging light which radiates from the same side as the first spherical wave, passes through the hologram recording layer and converges at an image-forming point distanced from the hologram recording layer by a predetermined distance, the planar wave intersecting with the first spherical wave and the second spherical wave.

12 Claims, 14 Drawing Sheets

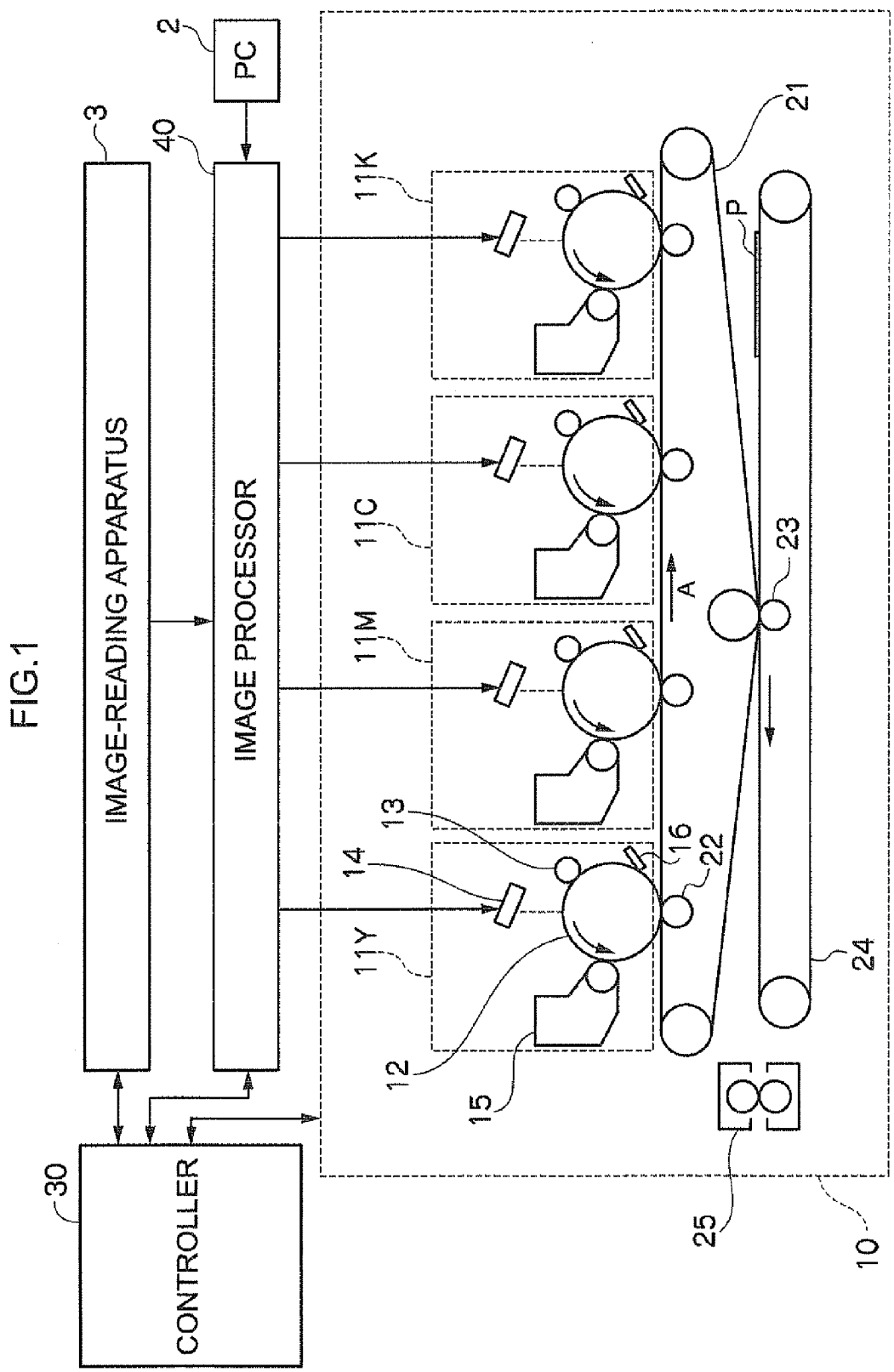

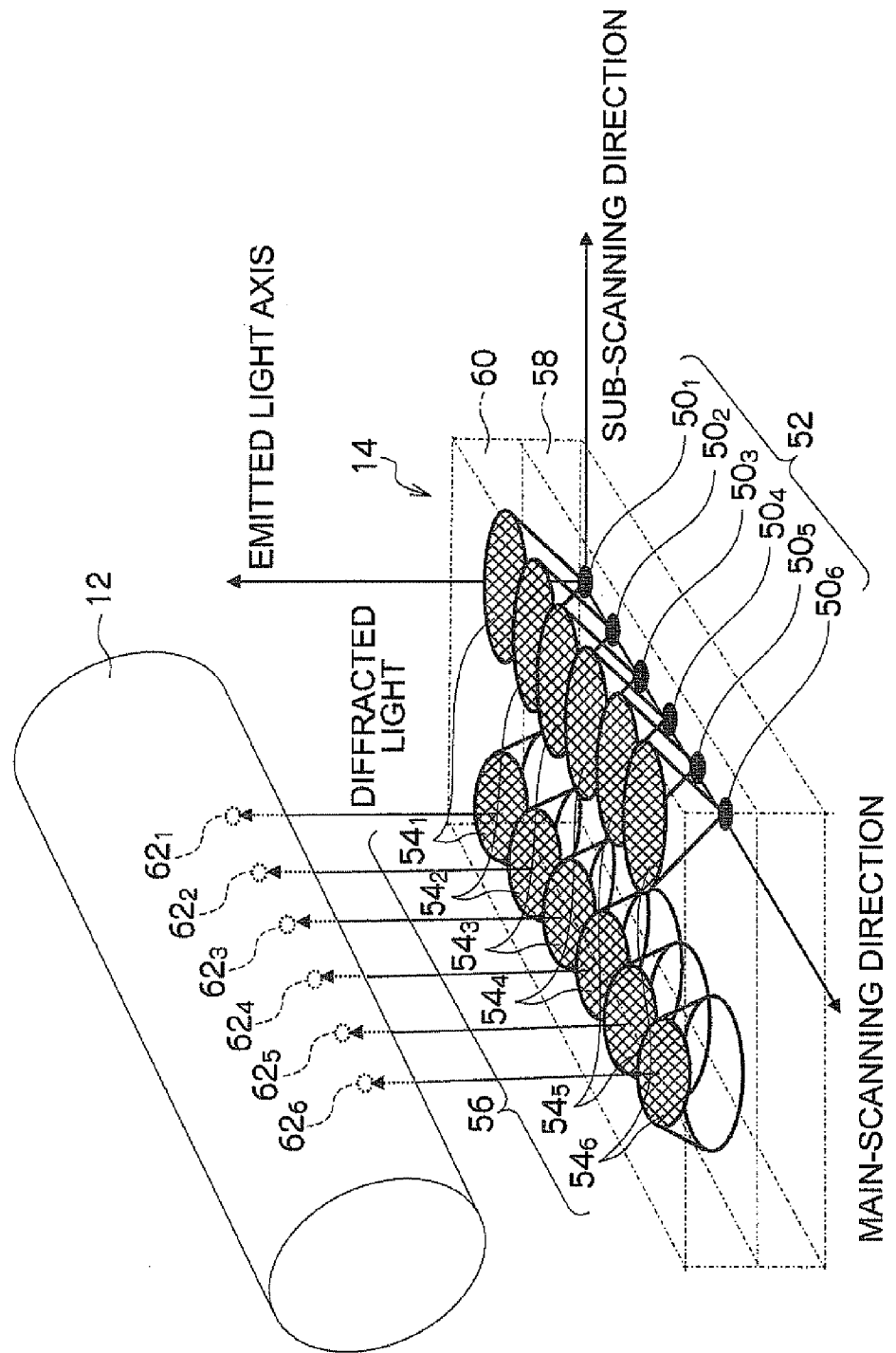

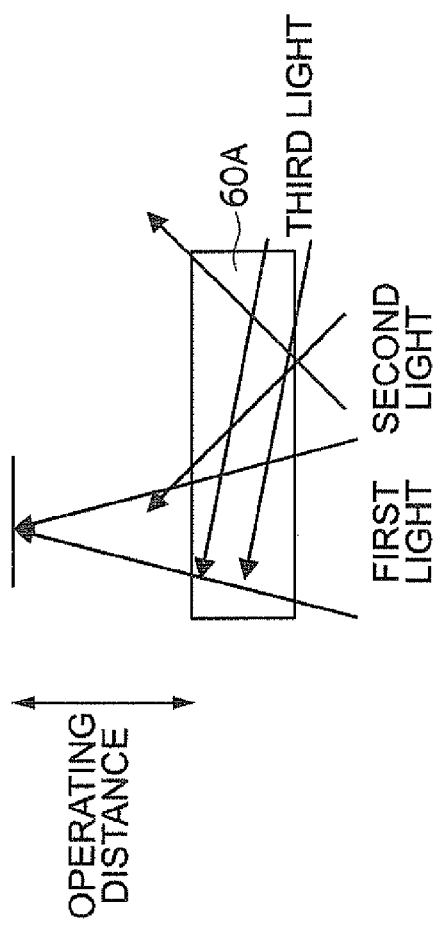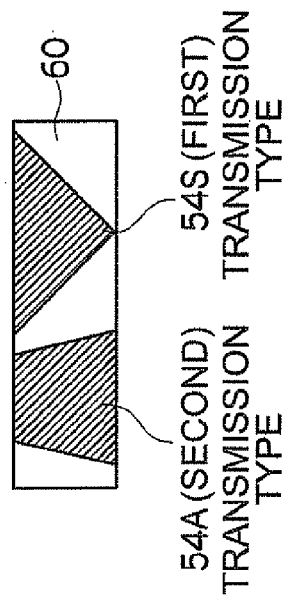

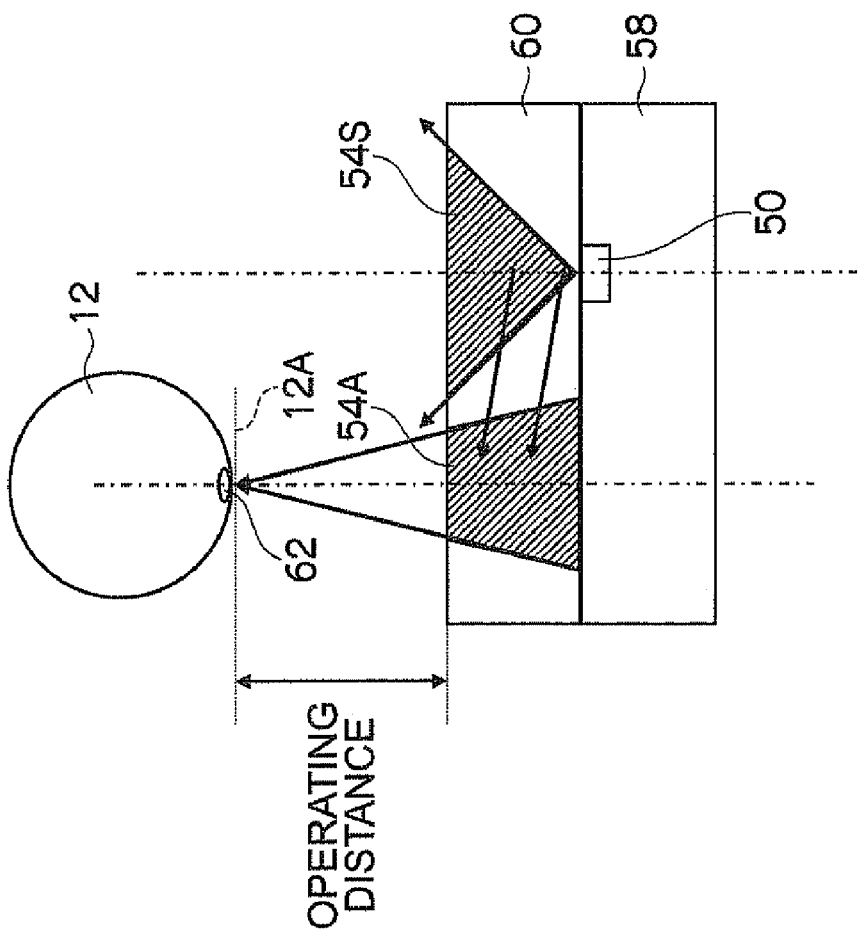
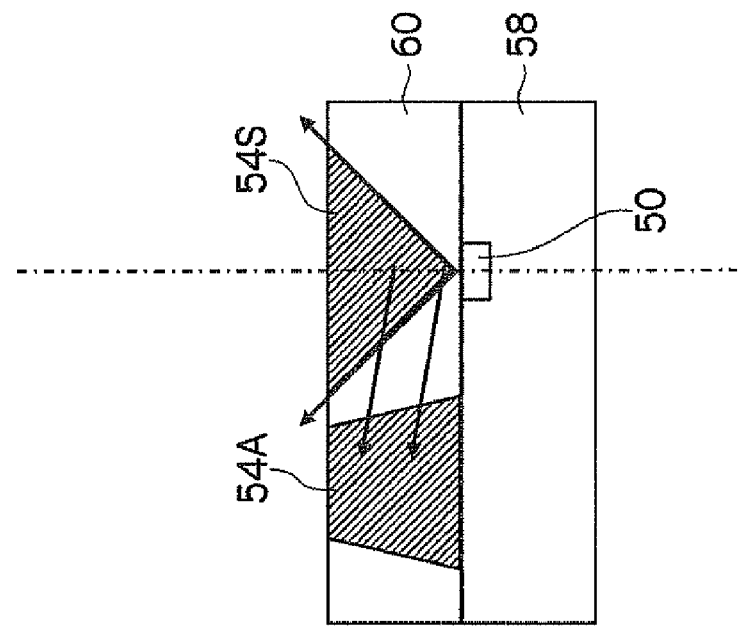

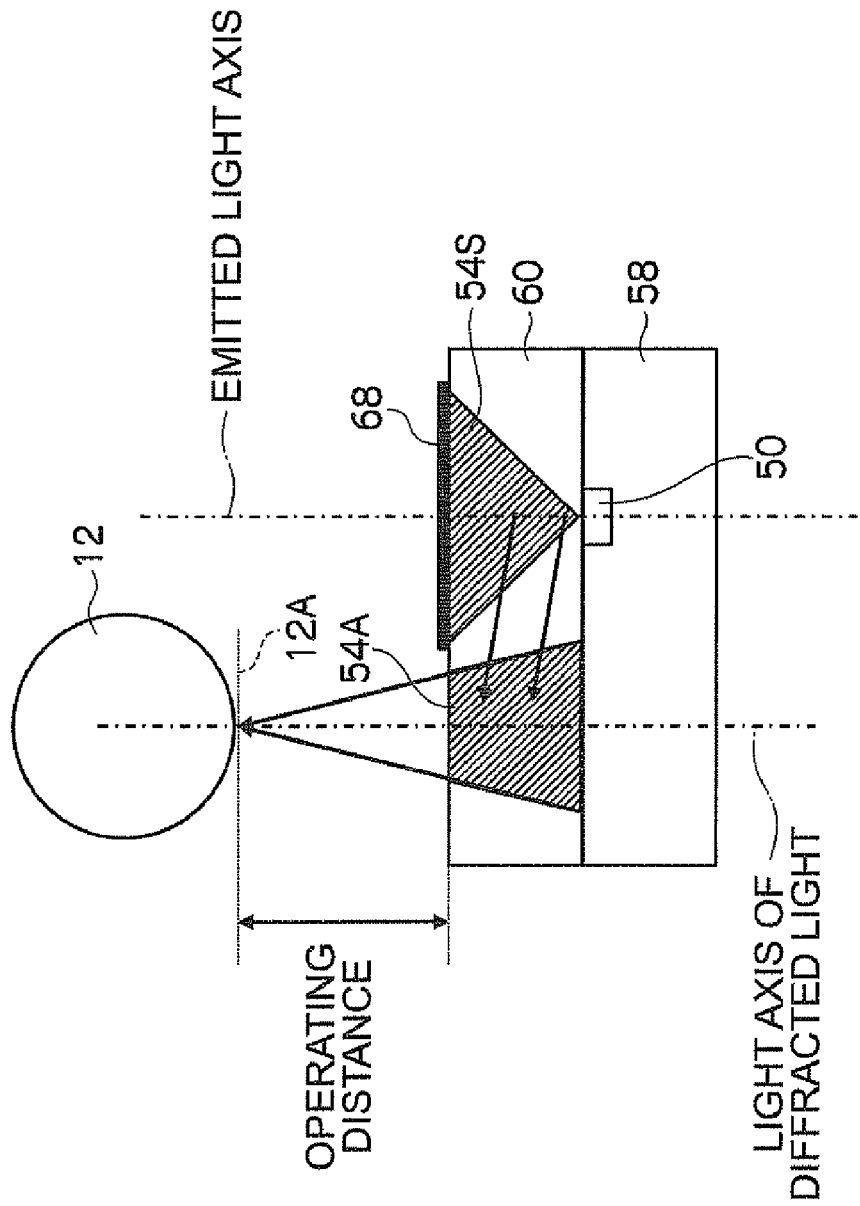

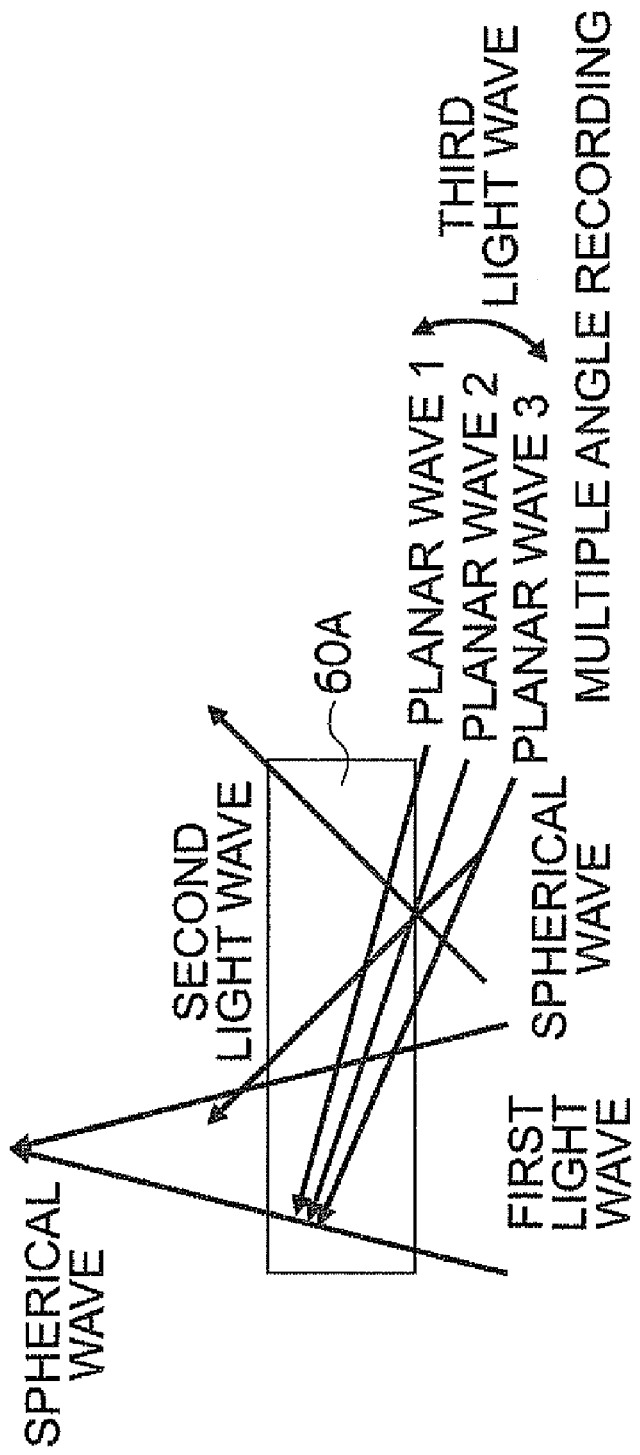

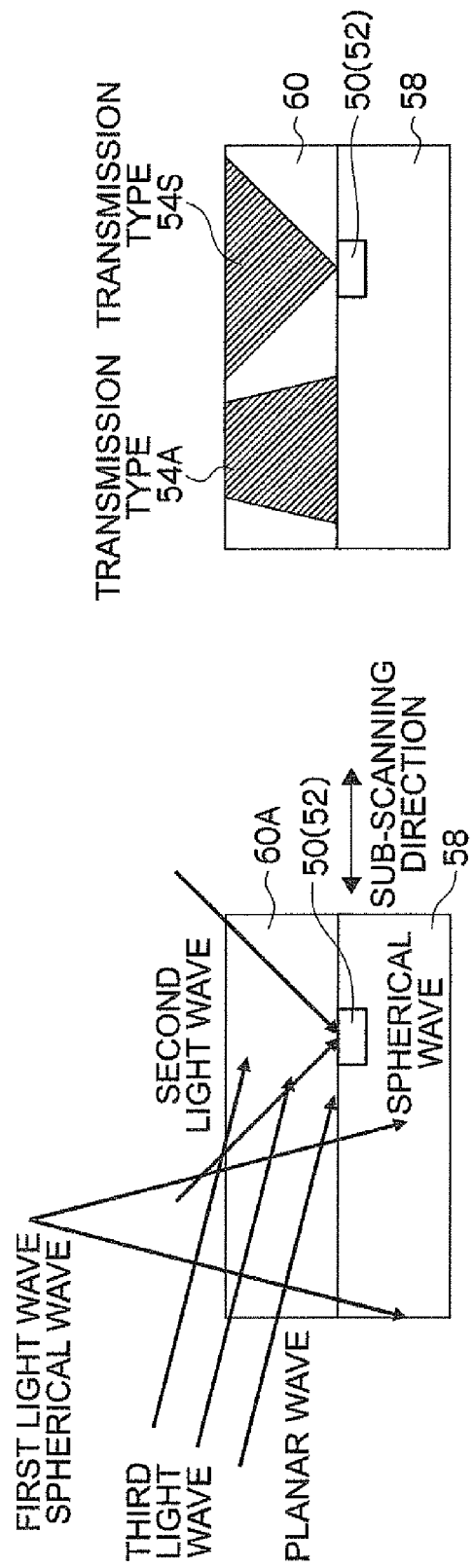

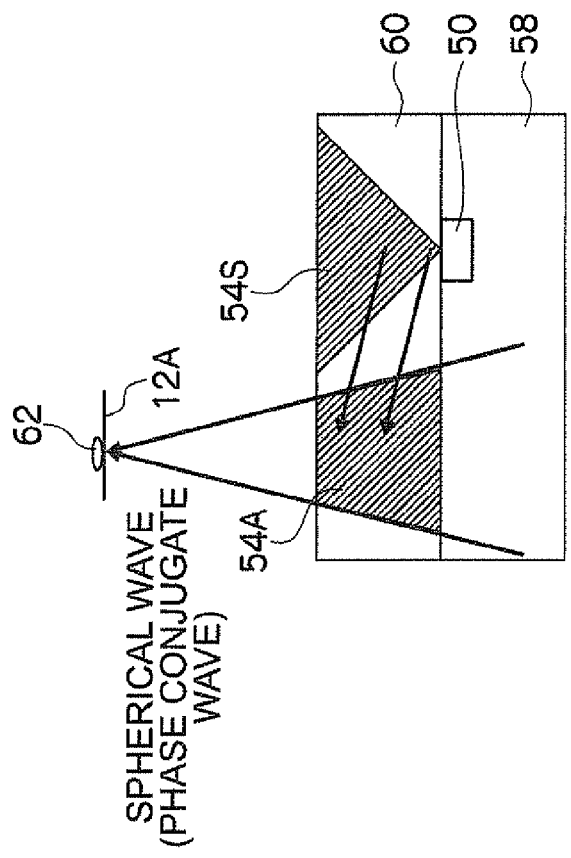
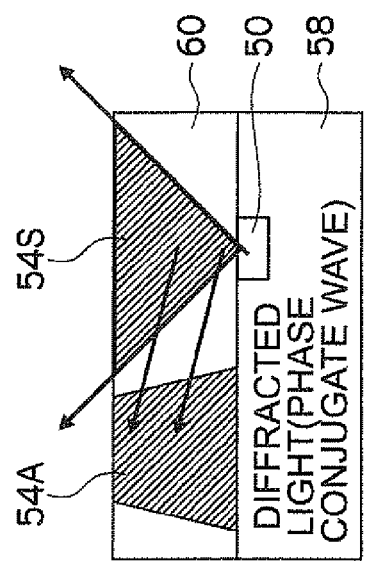

LIGHT-COLLECTING DEVICE, LIGHT-COLLECTING DEVICE ARRAY, EXPOSURE DEVICE AND IMAGE-FORMING APPARATUS

CROSS-REFERENCE TO RELATED APPLICATIONS

This application is based on and claims priority under 35 USC 119 from Japanese Patent Application No. 2009-066067 filed on Mar. 18, 2009.

BACKGROUND

1. Technical Field

The present invention relates to a light-collecting device, a light-collecting device array, an exposure device and an image-forming apparatus.

2. Related Art

Conventionally, in a copy machine, a printer and the like for forming an image by an electrophotographic method, a laser raster output scanner (ROS) type exposure device for scanning light emitted from a laser light source by a polygon mirror has been used as the exposure device for writing a latent image on the photoreceptor drum. Recently, an LED-type exposure device, which uses a light-emitting diode (LED) as a light source is becoming mainstream in place of the laser ROS type exposure device. The LED-type exposure device is referred to as an LED print head and is abbreviated as LPH.

The LED print head is provided with an LED array and a lens array. The LED array is obtained by disposing a number of LEDs on a long substrate. The lens array is obtained by disposing a number of graded refractive index rod lenses so as to correspond to each LED. A number of LEDs are disposed in the LED array so as to correspond to the number of pixels in a main-scanning direction, such as 1200 pixels per 1 inch (that is, 1200 dpi). As the graded refractive index rod lens, a cylindrical rod lens represented by Selfoc (Registered trademark) is used.

In the LED print head, light emitted from each LED is collected by the corresponding rod lens to form an erecting equal-magnification image on the photoreceptor drum. Therefore, the laser ROS type scan optical system is not required, and this may be made significantly small as compared to the laser ROS type. Also, a drive motor for driving the polygon mirror also is not required, so that mechanical noise does not occur.

On the other hand, in the LED print head, a light path length (operating distance) from the LED to the image-forming point becomes shorter, so that an occupation rate of the exposure device around the photoreceptor drum becomes larger. That is, circumference of the photoreceptor drum is not congested with a longer operating distance, and an entire image-forming apparatus may be made smaller.

As a matter of course, by arranging the lens array between the LED array and the photoreceptor drum, the operating distance becomes longer than length of the cylindrical rod lens as compared to a case in which the LED array is arranged close to the photoreceptor drum. However, the operating distance of the rod lens is a few millimeters, and the operating distance of a few centimeters may not be obtained unlike in the case of the laser ROS type.

Meanwhile, as the electrophotographic exposure device, the LED print head using the LED array is common, so that the exposure method is commonly known as an "LED type". However, it is not necessary to limit the light-emitting device to the LED, so that the "LED type" is appropriately referred to as a "light-emitting device array type" hereinafter.

SUMMARY

According to an aspect of the present invention, a light-collecting device includes: a first volume hologram recorded in a hologram recording layer by interference of a first spherical wave and a planar wave, the first spherical wave passing through a light path of diffused light which radiates from a light incident point positioned on a back surface of the hologram recording layer, passes through the hologram recording layer and spreads up to a predetermined diameter; and a second volume hologram recorded in the hologram recording layer by interference of a second spherical wave and the planar wave, the second spherical wave passing through a light path of converging light which radiates from the same side as the first spherical wave, passes through the hologram recording layer and converges at an image-forming point spaced apart from a front surface of the hologram recording layer by a predetermined distance, the planar wave intersecting with the first spherical wave and the second spherical wave in the hologram recording layer.

BRIEF DESCRIPTION OF THE DRAWINGS

FIG. 1 is a schematic diagram showing an example of a configuration of an image-forming apparatus according to a first embodiment of the present invention;

FIG. 2 is a schematic perspective view showing an example of a configuration of an LED print head as an exposure device according to a first embodiment of the present invention;

FIG. 4A is a view showing an example of a method of forming a light-collecting device in a hologram recording layer according to the first embodiment, and FIG. 4B is a view showing a volume hologram formed in the hologram recording layer;

FIGS. 5A and 5B are views showing a state in which diffracted light is generated from the light-collecting device;

FIG. 6 is a cross-sectional view showing a modified example of the first embodiment in which a light shielding film is provided;

FIGS. 7A and 7B are views for illustrating a multiply-recording method of the volume holograms and operation of multiply-recorded volume holograms;

FIG. 10A is a view showing an example of the method of forming the light-collecting device in the hologram recording layer according to a third embodiment, and FIG. 10B is a view showing the volume hologram formed in the hologram recording layer;

FIGS. 11A and 11B are views showing the state in which the diffracted light is generated from the light-collecting device;

DETAILED DESCRIPTION

First Embodiment

Image-Forming Apparatus

Figure 3A:
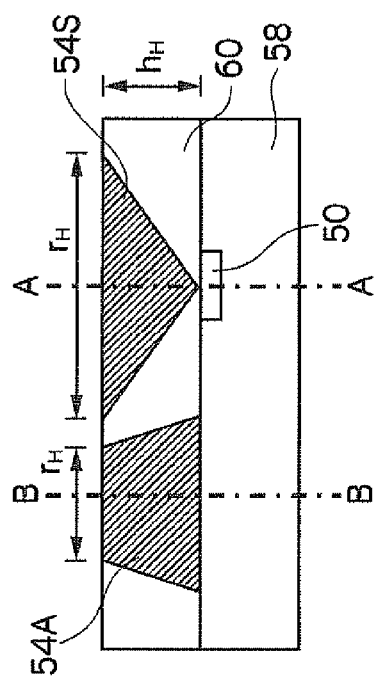
FIG. 3A is a cross-sectional view of the LED print head in a sub-scanning direction.

FIG. 1 is a schematic diagram showing an example of a configuration of an image-forming apparatus according to an embodiment of the present invention.

The image-forming apparatus is a so-called tandem-type digital color printer, and is provided with an image-forming processing unit 10, a controller 30 and an image processor 40. The image-forming processing unit 10 is an image-forming unit for performing image-formation in response to image data of respective colors. The controller 30 controls an operation of the image-forming apparatus. The image processor 40 is connected to an image-reading apparatus 3 and an external apparatus such as a personal computer (PC) 2, and performs a predetermined image processing to the image data received from the apparatuses.

The image-forming processing unit 10 is provided with four image-forming units 11Y, 11M, 11C and 11K arranged in parallel at constant intervals. Each of the image-forming units 11Y, 11M, 11C and 11K forms toner images of yellow (Y), magenta (M), cyan (C) and black (K), respectively. Meanwhile, the image-forming units 11Y, 11M, 11C and 11K are appropriately generically referred to as "image-forming units 11".

Each image-forming unit 11 is provided with a photoreceptor drum 12, a charger 13, an LED print head (LPH) 14, a developer 15 and a cleaner 16. The photoreceptor drum 12 is an image carrier for carrying the toner image by forming an electrostatic latent image. The charger 13 uniformly charges a surface of the photoreceptor drum 12 to a predetermined electrical potential. The LED print head (LPH) 14 is an exposure device for exposing the photoreceptor drum 12 charged by the charger 13. The developer 15 develops the electrostatic latent image obtained by the LPH 14. The cleaner 16 cleans the surface of the photoreceptor drum 12 after transfer.

The LPH 14 is a long print head of which length is substantially the same with length of the photoreceptor drum 12 in an axial direction. The LPH 14 has a plural LEDs disposed in an array in a length direction. The LPH 14 is arranged around the photoreceptor drum 12 such that the length direction thereof conforms to the axial direction of the photoreceptor drum 12. Also, in this embodiment, an operating distance of the LPH 14 is long, and the LPH 14 is arranged so as to be spaced apart from the surface of the photoreceptor drum 12 by a few centimeters. Therefore, an occupied width of the LPH 14 in a circumferential direction of the photoreceptor drum 12 is small, and congestion around the photoreceptor drum 12 is reduced.

Also, the image-forming processing unit 10 is provided with an intermediate transfer belt 21, a primary transfer roll 22, a secondary transfer roll 23, and a fuser 25. Toner images of respective colors formed by the photoreceptor drum 12 of each image-forming unit 11 are multiple-transferred on the intermediate transfer belt 21. The primary transfer roll 22 sequentially transfers (primarily transfers) the toner images of respective colors of each image-forming unit 11 on the intermediate transfer belt 21. The secondary transfer roll 23 collectively transfers (secondarily transfers) an overlapped toner image transferred on the intermediate transfer belt 21 on paper P, which is a recording medium. The fuser 25 fuses a secondarily transferred image to the paper P.

Next, an operation of the above-described image-forming apparatus is described.

First, the image-forming processing unit 10 performs image-forming operation based on a control signal such as a synchronization signal supplied from the controller 30. At this time, the image processor 40 performs the image processing to the image data input from the image-reading apparatus 3 and the PC 2, and the image data is supplied to each image-forming unit 11 through an interface.

For example, in the yellow image-forming unit 11Y, the surface of the photoreceptor drum 12 uniformly charged by the charger 13 to the predetermined electrical potential is exposed by the LPH 14, which emits light based on the image data obtained from the image processor 40, and the electrostatic latent image is formed on the photoreceptor drum 12. That is, the surface of the photoreceptor drum 12 is main-scanned by a light emission of each LED of the LPH 14 based on the image data. Along with this, by a rotation of the photoreceptor drum 12, the surface thereof is sub-scanned. Thereby, the electrostatic latent image is formed on the photoreceptor drum 12. The formed electrostatic latent image is developed by the developer 15, and the yellow toner image is formed on the photoreceptor drum 12. Similarly, the toner images of respective colors of magenta, cyan and black are formed by the image-forming units 11M, 11C and 11K.

The toner images of respective colors formed by each image-forming unit 11 are sequentially electrostatically sucked by the primary transfer roll 22 to be transferred (primarily transferred) on the intermediate transfer belt 21, which rotates in an arrow A direction in FIG. 1. The overlapped toner image is formed on the intermediate transfer belt 21. The overlapped toner image is conveyed to an area (secondary transferring unit) in which the secondary transfer roll 23 is arranged, with a movement of the intermediate transfer belt 21. When the overlapped toner image is conveyed to the secondary transferring unit, the paper P is supplied to the secondary transferring unit in accordance with a timing of conveying the toner image to the secondary transferring unit.

Then, the overlapped toner image is collectively electrostatically transferred (secondarily transferred) on the conveyed paper P by a transfer electric field formed by the secondary transfer roll 23 in the secondary transferring unit. The paper P on which the overlapped toner image is electrostatically transferred is removed from the intermediate transfer belt 21, and is conveyed to the fuser 25 by a conveyer belt 24. The toner image, which is not yet fused, on the paper P conveyed to the fuser 25 is fused to the paper P by a fusing process with heat and pressure by the fuser 25. Then, the paper P on which the fused image is formed is ejected to a paper output tray (not shown) provided on an ejecting unit of the image-forming apparatus.

<LED Print Head (LPH)>
(Configuration of LPH)

Figure 3B:
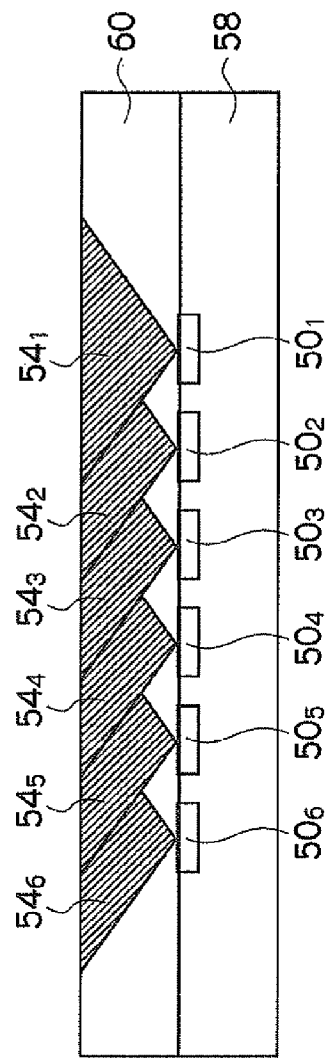
FIGS. 3B and 3C are cross-sectional views of the LED print head in a main-scanning direction.
Figure 3C:
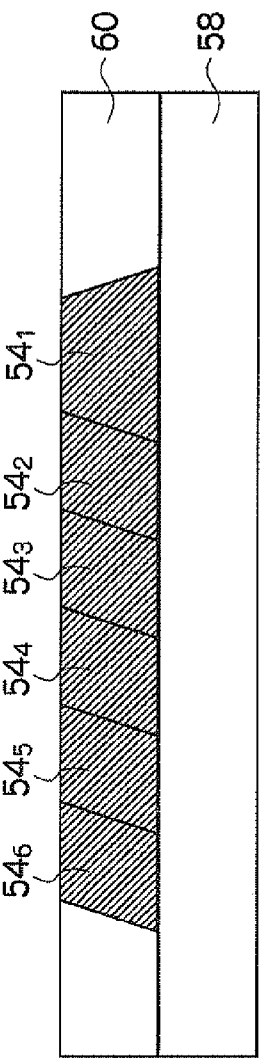

FIG. 2 is a schematic perspective view showing an example of a configuration of the LED print head as the exposure device according to the embodiment of the present invention. FIG. 3A is a cross-sectional view of the LED print head in a sub-scanning direction, and FIGS. 3B and 3C are cross-sectional views of the LED print head in a main-scanning direction. FIG. 3B is a cross-sectional view taken along the line A-A of FIG. 3A, and FIG. 3C is a cross-sectional view taken along the line B-B of FIG. 3A.

As shown in FIG. 2, the LED print head (LPH) 14 is provided with an LED array 52 and a light-collecting device array 56. The LED array 52 is provided with a plural LEDs $50_1$~$50_6$. The light-collecting device array 56 is provided with a plural light-collecting devices 54 provided so as to correspond to each of the plural LEDs $50_1$~$50_6$. Each of the light-collecting devices $54_1$~$54_6$ is provided with a pair of volume holograms formed of a conical volume hologram and a truncatedly conical volume hologram. A configuration of the light-collecting devices $54_1$~$54_6$ will be described later. In an example shown in FIG. 2, the LED array 52 is provided with six LEDs $50_1$ to $50_6$. Also, the light-collecting device array 56 is provided with six light-collecting devices $54_1$ to $54_6$. Meanwhile, the LEDs $50_1$ to $50_6$ are generically referred to as "LEDs 50" and the light-collecting devices $54_1$ to $54_6$ are generically referred to as "light-collecting devices 54", when it is not necessary to distinguish each of them.

Each of the plural LEDs 50 is mounted on a long LED substrate 58 together with a drive circuit (not shown) for driving each of the LEDs 50. As described above, each of the LEDs 50 is disposed in a length direction of the LED substrate 58, which is parallel to the axial direction of the photoreceptor drum 12. A disposing direction of the LEDs 50 is the "main-scanning direction". Also, each of the LEDs 50 is disposed such that an interval (light-emitting point pitch) between two adjacent LEDs 50 (light-emitting point) in the main-scanning direction is constant. Meanwhile, the sub-scan is performed by the rotation of the photoreceptor drum 12, and a direction orthogonal to the "main-scanning direction" is shown as the "sub-scanning direction".

The light-collecting device array 56 is formed in a hologram recording layer 60 laminated on the LED substrate 58. The hologram recording layer 60 is composed of a high-polymer material capable of permanent recording of the hologram. As such a high-polymer material, a so-called photopolymer may be used. The photopolymer records the hologram by utilizing a refractive-index change due to a polymerization of a photo-polymerizable monomer. Each of the light-collecting devices 54 is disposed in the main-scanning direction corresponding to each of the LEDs 50. Also, each of the light-collecting devices 54 is arranged such that the interval between two adjacent light-collecting devices 54 in the main-scanning direction is the same as the above-described light-emitting point pitch.

As shown in FIGS. 3A to 3C, each of the light-collecting devices 54 is provided with a conical volume hologram 54S having a base surface on a front surface side of the hologram recording layer 60, which converges toward an LED 50 side, and a truncatedly conical volume hologram 54A having a lower base on a back surface side of the hologram recording layer 60 and an upper base on the front surface side thereof. Meanwhile, it is not necessary to precisely form a cone or a truncated cone, and they may be an elliptic cone or an elliptic truncated cone. Diffracted light is emitted from the front surface side of the hologram recording layer 60, that is, from the upper base side of the volume hologram 54A. In this embodiment, each of the volume holograms 54S and 54A is recorded as a transmission hologram.

In the volume hologram 54S, a diameter of the upper base is set as "hologram diameter $r_H$" and a height of the cone is set as "hologram thickness $h_H$". In the volume hologram 54A, a diameter of the upper base is set as "hologram diameter $r_H$" and a height of the truncated cone is set as "hologram thickness $h_H$". Each of the volume holograms 54S and 54A has the hologram diameter $r_H$ larger than the light-emitting point pitch. The hologram diameter $r_H$ of the volume hologram 54A determines an NA of the light-collecting device. As the hologram diameter $r_H$ becomes larger, the operating distance becomes longer. The hologram diameter $r_H$ of the volume hologram 54A is optionally set according to a desired operating distance.

For example, the light-emitting point pitch is 30 μm, the hologram diameter $r_H$ of the volume hologram 54S is 1.5 mm, the hologram diameter $r_H$ of the volume hologram 54A is 1.5 mm and the hologram thickness $h_H$ is 1 mm. At this time, assuming that a wavelength is 780 nm, a spot having a diameter of 25 μm at a minimum may be formed on a position spaced apart from the upper base of the hologram 54A by 2 cm. When the distance from the upper base to the spot forming position is made shorter, a spot size may further be made smaller. The spot size or the distance from the upper base to the spot forming position is set according to the NA of converging light, which records the volume hologram 54A. In this manner, as shown in FIGS. 2, 3B and 3C, the two adjacent light-collecting devices 54 are formed so as to be largely overlapped with each other.

Each of the plural LEDs 50 is arranged on the LED substrate 58 such that a light-emitting surface thereof faces to the front surface side of the hologram recording layer 60 in order to emit light on a side of the corresponding light-collecting device 54. An "emitted light axis" of the LED 50 passes through a center (symmetrical axis of the cone) of the corresponding volume hologram 54S and is orthogonal to the LED substrate 58, for example. As shown, the emitted light axis is orthogonal to the above-described main-scanning direction and sub-scanning direction.

As the LED array 52, an SLED array, which is composed of a plural serially-disposed SLED chips (not shown) on which a plural self-scanning LEDs (SLEDs) are disposed, may be used. The SLED array turns on and off a switch by two signal lines. Therefore, each of the SLEDs is allowed to selectively emit light, and a data line may be made common. By using the SLED array, the number of wires on the LED substrate 58 may be reduced.

Also, although not shown, the LPH 14 is held by a carrier such as a housing and a holder such that the diffracted light generated by the light-collecting device 54 is emitted in a direction of the photoreceptor drum 12. Also, the LPH 14 is attached to a predetermined position in the image-forming unit 11. Meanwhile, the LPH 14 is configured so as to be movable in a light axis direction of the diffracted light by an adjusting unit such as an adjusting screw (not shown). The adjusting unit adjusts an image-forming position (focal plane) by the light-collecting device 54 so as to be positioned on the surface of the photoreceptor drum 12. Also, it is preferable that a protective layer is formed of a cover glass or the like on the hologram recording layer 60. The protective layer prevents an adhesion of dust.

(Operation of LPH)

Next, operation of the LPH 14 is briefly described.

First, a principle of recording and reproducing of the light-collecting device 54 is briefly described. FIG. 4A is a view showing an example of a method of forming the light-collecting device (a pair of volume holograms) in the hologram recording layer. Here, an example of forming a pair of transmission holograms as the light-collecting device is described. The photoreceptor drum 12 is omitted, and only a surface 12A, which is an image-forming plane, is shown. In addition, a hologram recording layer 60A is the recording layer before the light-collecting devices 54 are formed, and this is distinguished from the hologram recording layer 60 in which the light-collecting devices 54 are already formed by attaching a symbol A to the reference numeral 60. The hologram recording layer 60A may be formed on a temporary substrate such as a glass substrate, which may be removed later.

As shown in FIG. 4A, the light-collecting device 54 is formed by an interference of three light waves. A spherical wave, which passes through a light path of the diffracted light forming an image on the surface 12A, is applied to the hologram recording layer 60A as a "first light wave". Also, a spherical wave, which passes through a light path of the diffused light spreading from the light-emitting point to a desired hologram diameter $r_H$ when passing through the hologram recording layer 60A, is applied to the hologram recording layer 60A as a "second light wave". At the same time, a planar wave, which intersects with the first light wave and the second light wave in the hologram recording layer 60A, is applied to the hologram recording layer 60A as a "third light wave". When the third light wave is the planar wave, a degree of overlap with the first light wave and the second light wave, which are the spherical waves, increases.

Each of the first to third light waves is a coherent light. A laser light source such as a semiconductor laser is used to apply the coherent light. The first to third light waves are applied from the same side (side on which the LED substrate 58 is arranged) to the hologram recording layer 60A. An interference pattern (intensity distribution) obtained by the interference of the three light waves is recorded in a thickness direction of the hologram recording layer 60A. Meanwhile, in a case of the photopolymer or the like, which requires the fusing process, the fusing process is performed by an ultraviolet light irradiation or the like after the hologram recording.

As shown in FIG. 4B, the conical volume hologram 54S is formed by the interference of the second and third light waves. The truncatedly conical volume hologram 54A is formed by the interference of the first and third light waves. Thereby, the hologram recording layer 60 in which a pair of transmission holograms are formed is obtained. The hologram recording layer 60 is attached on the LED substrate 58 on which the LED array 52 is mounted. Thereby, the LPH 14 obtained by integrating the LED array 52 and the light-collecting device array 56 is fabricated (refer to FIG. 3).

FIGS. 5A and 5B are views showing a state in which the diffracted light is generated from the light-collecting device. As shown in FIG. 5A, when the LED 50 is allowed to emit light, the diffused light emitted from the LED 50 passes through the light path of the diffused light spreading from the light-emitting point to the hologram diameter $r_H$. Since the light emitted from the LED 50 is an incoherent light, a wave front thereof is different from that of the laser light (coherent light) used in the recording. By an incidence of such an incoherent light to the volume hologram 54S, a component satisfying a Bragg condition is diffracted. In other words, only the component substantially the same as that of the recording light out of the incoherent light, which is incident light, is selected (filtered) by the volume hologram 54S to generate the diffracted light. The diffracted light is the planar wave substantially the same as the third light wave. The diffracted planar wave is applied to the volume hologram 54A.

As shown in FIG. 5B, when the planar wave is applied to the volume hologram 54A, the spherical wave substantially the same as the first light wave is reproduced from the volume hologram 54A and is emitted as the diffracted light. The emitted diffracted light converges to form an image on the surface 12A of the photoreceptor drum 12 with the operating distance of a few centimeters. A spot 62 is formed on the surface 12A. Especially, the volume hologram has high incident angle selectivity and wavelength selectivity, and this reproduces the signal light with high accuracy to form a minute spot with a clear contour on the surface 12A.

In a precise sense, the spherical wave (second light wave) at the time of recording and the diffused light of the LED 50 have different wave fronts. Therefore, the planar wave diffracted from the volume hologram 54S by irradiation of the diffused light from the LED 50 includes, in addition to the planar wave satisfying the Bragg condition (transmitted in a same direction as in the case of the recording), the planar wave diffracted in a range allowed by Bragg selectivity. Although the latter diffracted light has the transmission direction different from that of the planar wave (third light wave) at the time of the recording, the intensity thereof is weak.

Further, the weak planar wave slightly generates the spherical wave of which diffraction angle is shifted in the range allowed by the Bragg selectivity by the volume hologram 54A (Bragg mismatch). The spherical wave with the shifted diffraction angle collects light on a position different from that of the spherical wave (first light wave) at the time of the recording, so that this serves to enlarge the spot. However, the spherical wave (diffracted light) with the shifted diffraction angle has negligible intensity. This is because the intensity of the incident light generating the diffracted light is weak and diffraction efficiency of the spherical wave with the shifted diffraction angle also is minute. Therefore, enlargement of the light-collecting spot is not substantially problematic, and the minute light-collecting spot is formed.

In other words, in the volume hologram 54S, the planar wave of which transmission direction is different from that of the third light wave is hardly generated, and in the volume hologram 54A, the spherical wave with the diffraction angle shifted from that of the first light wave is hardly generated. In this manner, the volume holograms 54S and 54A have a high incident angle selectivity and wavelength selectivity. Therefore, the coherence is improved by the filtering function thereof. Therefore, the minute spot is formed from the incoherent light by the two volume holograms 54S and 54A.

Similarly, as shown in FIG. 2, in the LPH 14 provided with the LED array 52 and the light-collecting device array 56, each light emitted from each of the six LEDs $50_1$ to $50_6$ is incident on any of the corresponding light-collecting devices $54_6$ to $54_6$. The light-collecting devices $54_1$ to $54_6$ diffract the incident light to generate the diffracted light. Each diffracted light generated by each of the light-collecting devices $54_1$ to $54_6$ is emitted in the direction of the photoreceptor drum 12 and is collected in the direction of the photoreceptor drum 12. The light axis direction of the diffracted light is oriented in the direction of the photoreceptor drum 12.

Each emitted diffracted light converges in the direction of the photoreceptor drum 12, and forms an image on the surface of the photoreceptor drum 12 arranged on the focal plane a few centimeters ahead. That is, each of the plural light-collecting devices 54 serves as an optical member, which diffracts the light emitted from the corresponding LEDs 50 to collect, thereby forming an image on the surface of the photoreceptor drum 12. On the surface of the photoreceptor drum 12, minute spots $62_1$ to $62_6$ by each diffracted light are formed so as to be disposed in the main-scanning direction. In other words, the photoreceptor drum 12 is main-scanned by the LPH 14. Meanwhile, the spots $62_1$ to $62_6$ are generically referred to as "spots 62" when it is not required to be distinguished from each other.

Meanwhile, as is understood from FIG. 5B, the emitted light axis and the light axis of the diffracted light are parallel to each other by making each of the light axis of the first light wave and the light axis of the second light wave parallel to the emitted light axis. That is, the diffracted light is emitted in the same direction as that of the emitted light (diffused light). Therefore, as shown in FIG. 6, a light shielding film 68 such as a light absorbing film may be arranged on a diffused light transmission side of the hologram recording layer 60 in order to prevent unnecessary exposure of the photoreceptor drum 12 by the transmission light. The light shielding film 68 is arranged on the light path of the transmitted diffused light. In an example shown in FIG. 6, the light shielding film 68 is arranged on the surface of the hologram recording layer 60 so as to cover the base surface of the conical volume hologram 54S.

(Size of Each Device of LPH)

In FIG. 2, the example in which the six LEDs $50_1$ to $50_6$ are disposed in line is schematically shown. However, thousands of LEDs 50 are disposed according to a resolution of the image-forming apparatus in the main-scanning direction. For example, when describing the example of the SLED array, the SLED array is composed of 58 serially-disposed SLED chips in which 128 LEDs are disposed at 1200 spots per inch (spi) interval. That is, 7424 SLEDs are disposed at 21 μm intervals in the image-forming apparatus of 1200 dpi resolution.

When forming the spot by collecting light by a light-collecting lens, a limit of spot minimization is determined depending on a diffraction phenomenon of light. The spot formed by the light-collecting lens is referred to as an Airy disk. A diameter (spot size) φ of the Airy disk is represented as φ=1.22λ/NA using a wavelength λ and numerical aperture NA of the light-collecting lens.

In a "light-emitting device array method", an interval (pixel pitch) of the minute spot formed on the photoreceptor drum 12 has substantially the same length as that of the light-emitting point pitch. Therefore, adjacent spots are overlapped unless the spot size is made smaller than the light-emitting point pitch (pixel pitch). For example, with the 1200 dpi resolution, the spot size φ of approximately 20 μm is required. For example, when the wavelength is 780 nm, the numerical aperture NA is larger than 0.048 in order to realize the spot size φ of approximately 20 μm.

Here, length of the light path from (not the LED 50 but) an emission end face of the light-collecting device 54 (upper base of the truncatedly conical volume hologram 54A) to the spot 62 is approximated to the "operating distance". The approximated operating distance is represented as a substantial $r_H/(2NA)$. Therefore, assuming that the NA is larger than 0.048 and it is tried to set the operating distance to 1 cm or larger, the diameter (hologram diameter $r_H$) of the upper base of the volume hologram 54A should be set to 1 mm or larger. As described later, the spot size φ of approximately 20 μm may be realized with the operating distance of 2 cm, when the hologram diameter $r_H$=2 mm and the hologram thickness $h_H$=1 mm.

(Multiply-Recording of Volume Hologram)

As described with reference to FIGS. 4 and 5, each of the light-collecting devices 54 formed of a pair of volume holograms 54S and 54A serves as the light-collecting device to form the minute spot from the incoherent light, which diffuses as the emitted light of the LED 50. Here, a configuration of the light-collecting device array 56 in which a plural light-collecting devices 54 are multiply-recorded to form an array is described.

As shown in FIG. 7A, a writing optical system for simultaneously applying each of the first light wave (spherical wave), the second light wave (spherical wave) and the third light wave (planar wave) is prepared. The writing optical system is set such that first light wave and the second light wave are applied to a predetermined position. On the other hand, the writing optical system is set such that the third light wave is applied while changing the angle. The hologram recording layer 60A is moved relative to the writing optical system. The hologram recording layer 60A is moved with the light-emitting point pitch such that the second light wave sequentially diffuses from the position on which each of the plural LEDs 50 is arranged.

Figure 7B:
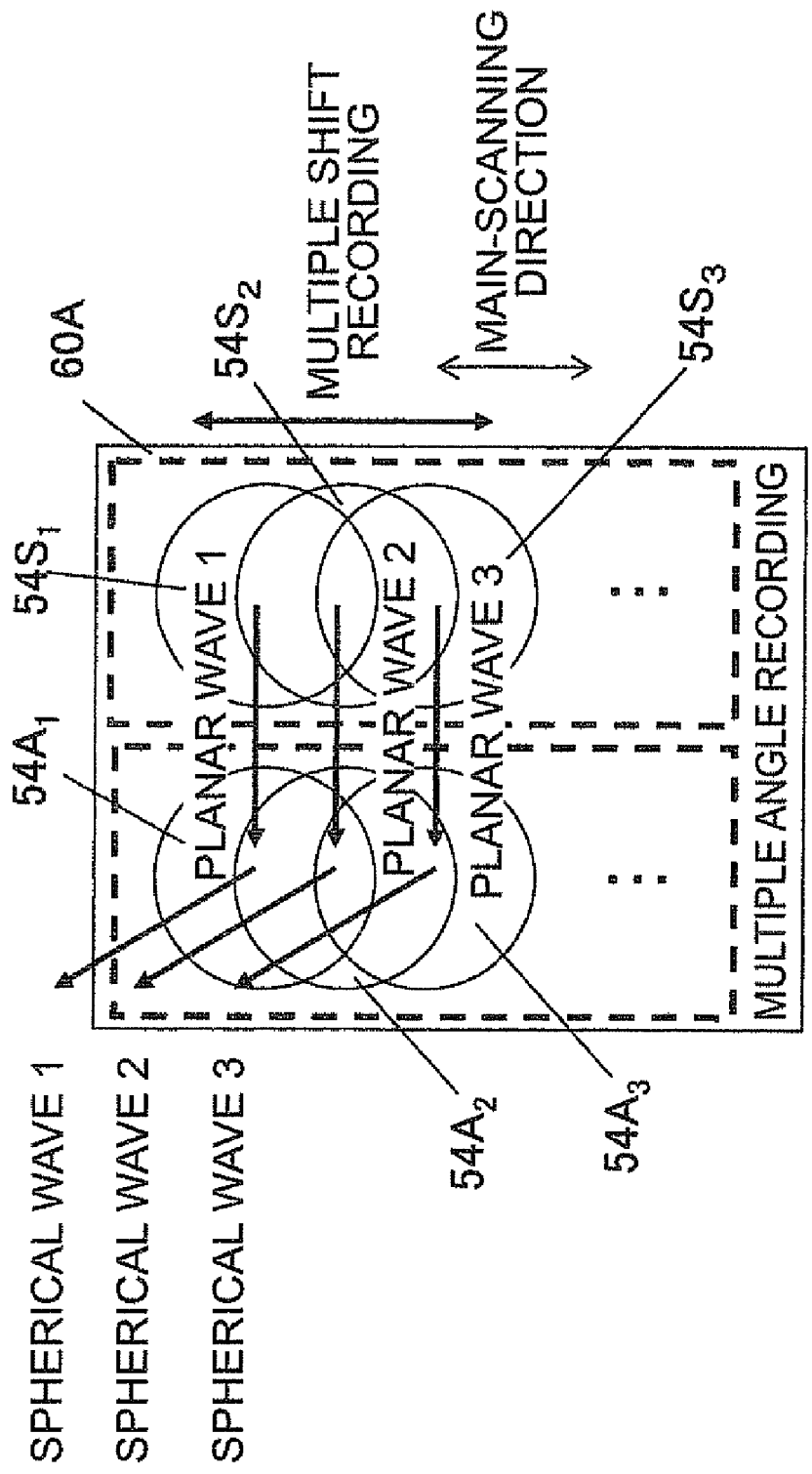

Thereby, as shown in FIG. 7B, the plural light-collecting devices 54 are multiply-recorded in the hologram recording layer 60A by a multiple spherical wave shift method and a multiple angle method. That is, the conical volume holograms $54S_1$, $54S_2$, $54S_3$ . . . are sequentially multiply-recorded by the spherical wave shift multiply-recording by the movement of the hologram recording layer 60A. With this, the truncatedly conical volume holograms $54A_1$, $54A_2$, $54A_3$ . . . are sequentially multiply-recorded according to the planar waves 1, 2 and 3 having different angles by the multiple angle method by the angle change of the third light wave.

As described above, each light emitted from each of the plural LEDs 50 is diffracted by the corresponding light-collecting device 54, and the diffracted light is emitted in the direction of the photoreceptor drum 12. Each emitted diffracted light converges in the direction of the photoreceptor drum 12 without cross talk, and forms an image on the surface of the photoreceptor drum 12. Each of a plural mutually independent minute spots 62 is formed on the surface of the photoreceptor drum 12 so as to be in line in the main-scanning direction.

In detail, the emitted light of the LED $50_1$ is applied to the volume hologram $54S_1$, and the planar wave 1 is diffracted from the volume hologram $54S_1$. At this time, the diffracted light from the volume hologram 54S other than the volume hologram $54S_1$ is not generated because of the shift selectivity. The planar wave 1 diffracted from the volume hologram $54S_1$ is applied to the volume hologram $54A_1$, and the spherical wave 1 is diffracted from the volume hologram $54A_1$. At this time, the diffracted light from the volume hologram 54A other than the volume hologram $54A_1$ is not generated because of the angle selectivity. The diffracted spherical wave 1 is transmitted to form the minute spot.

With the similar principle, the spherical waves 2 and 3 are generated from the volume holograms $54S_2$ and $54A_2$ and the volume holograms $54S_3$ and $54A_3$, . . . to form the minute spot. In this manner, by utilizing the shift selectivity and the angle selectivity of the volume hologram, a minute spot line is formed while preventing the cross talk.

Meanwhile, it may be possible that each of the plural light-collecting devices 54 is multiply-recorded (wavelength multiply-recorded) while further changing the wavelengths. In the above-described principle, only the light in a band of a few nanometers around a recording wavelength may be taken out from the wavelength band of the emitted light of the LED 50 as the converging light. When the wavelength band to be taken out may be made larger by the wavelength multiply-recording, the wavelength in the vicinity of each recording wavelength contributes to form the converging light, thereby improving the light use efficiency of the LED 50.

Also, in order to improve a quality of the light-collecting spot 62, it is possible to adjust a refractive index and the light path of the hologram recording layer 60 such that a focal point of the spherical wave (first light wave) and the light path length of the volume hologram 54A are not larger than the light path lengths of the volume hologram 54S and the volume hologram 54A.

Second Embodiment

The LED print head according to a second embodiment has the same configuration as that of the image-forming apparatus and the LED print head according to the first embodiment, except that each of the plural light-collecting devices 54 in the light-collecting device array 56 is composed of a pair of reflection holograms. Therefore, the same reference numeral is given to the same component and the description thereof is omitted. FIG. 8A is a view showing an example of the method of forming the light-collecting device (a pair of volume holograms) in the hologram recording layer.

As shown in FIG. 8A, the light-collecting device 54 is formed by the interference of the three light waves. As in the case of the first embodiment, the hologram recording layer 60A is irradiated with the first light wave (spherical wave), the second light wave (spherical wave) and the third light wave (planar wave), which are the coherent lights. The first light wave and the second light wave are applied from the same side (a back surface side on which the LED substrate 58 is arranged) to the hologram recording layer 60A. On the other hand, the third light wave is applied from an opposite side (a front surface side of the hologram recording layer 60A) to the hologram recording layer 60A. The interference pattern (intensity distribution) obtained by the interference of the three light waves is recorded along the thickness direction of the hologram recording layer 60A.

Figure 8B:
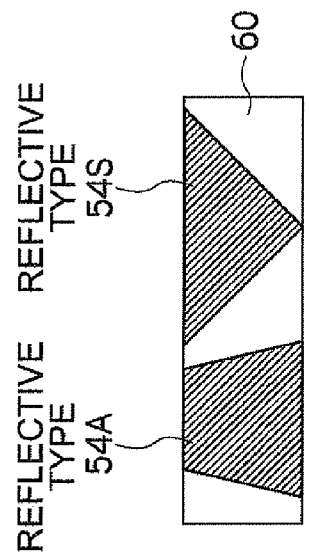
FIG. 8B is a view showing the volume hologram formed in the hologram recording layer.
Figure 8A:
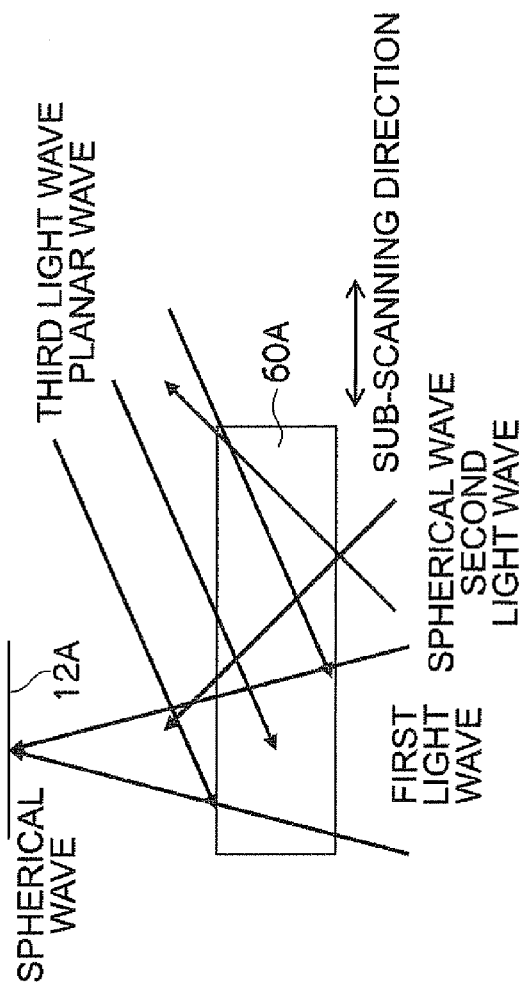
FIG. 8A is a view showing an example of the method of forming the light-collecting device in the hologram recording layer according to a second embodiment.

As shown in FIG. 8, the conical volume hologram 54S is formed by the interference of the second and third light waves. The truncatedly conical volume hologram 54A is formed by the interference of the first and third light waves. Thereby, the hologram recording layer 60 in which a pair of reflection holograms are formed is obtained. By attaching the hologram recording layer 60 on the LED substrate 58 on which the LED array 52 is mounted, the LPH 14 obtained by integrating the LED array 52 and the light-collecting device array 56 is fabricated (refer to FIG. 3).

Figure 9A:
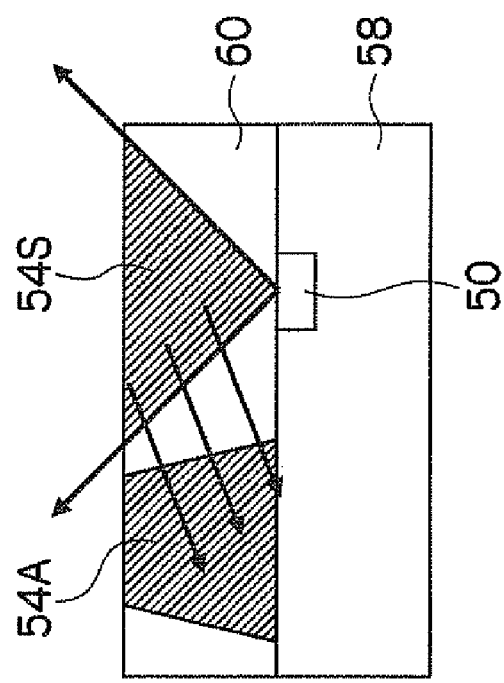
FIGS. 9A and 9B are views showing the state in which the diffracted light is generated from the light-collecting device.
Figure 9B:
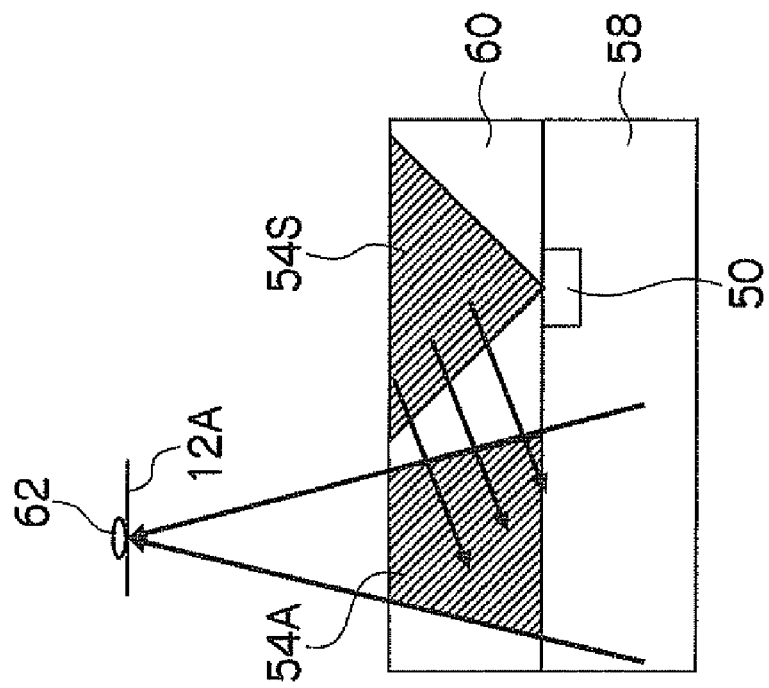

FIGS. 9A and 9B are views showing the state in which the diffracted light is generated from the light-collecting device. As shown in FIG. 9A, the emitted light from the LED 50 is incident on the volume hologram 54S. As described in the first embodiment, the emitted light from the LED 50 is the incoherent light, so that the wave front thereof is different from that of the laser light (coherent light) used in the recording. The component satisfying the Bragg condition is diffracted by the incidence of such incoherent light to the volume hologram 54S. In other words, only the component substantially the same as that of the recording light out of the incoherent light, which is the incident light, is selected (filtered) by the volume hologram 54S to generate the diffracted light. The diffracted light is the planar wave substantially the same as the third light wave. The diffracted planar wave is applied to the volume hologram 54A.

As shown in FIG. 9B, when the planar wave is applied to the volume hologram 54A, the spherical wave substantially the same as the first light wave is reproduced from the volume hologram 54A and is emitted as the diffracted light. The emitted diffracted light converges to form an image on the surface 12A of the photoreceptor drum 12 with the operating distance of a few centimeters. The spot 62 is formed on the surface 12A.

As in the case of the first embodiment, the volume holograms 54S and 54A have the high incident angle selectivity and wavelength selectivity. Therefore, the coherence is improved by the filtering function thereof. Accordingly, the minute spot is formed from the incoherent light by the two volume holograms 54S and 54A.

Here, difference between the characteristics of the reflective volume hologram and the transmission volume hologram is described. Hereinafter, the volume holograms are simply referred to as a "transmission hologram" and a "reflection hologram". The transmission hologram has better shift selectivity and angle selectivity than the reflection hologram. Therefore, an unnecessary diffracted light (cross-talk) from the adjacent hologram is reduced in the light-collecting device formed of a pair of transmission holograms. Therefore, it is desirable that the light-collecting device formed of the transmission holograms is used for a high-density LED array.

On the other hand, the reflection hologram has an advantage that a recording condition may be set more easily than in the transmission hologram. When irradiating with energy more than the energy with 100 percent diffraction efficiency in recording, the diffraction efficiency of the transmission hologram is decreased. On the other hand, the diffraction efficiency does not change in the reflection hologram and converges to a constant value. Therefore, the setting of the recording condition, that is, the setting of the diffraction efficiency is easier in the reflection hologram. That is, the light-collecting device formed of the reflection holograms is more suitable to uniformize the intensity of each diffraction spot.

Also, a pitch of the interference pattern is narrower and a wavelength filtering function is more enhanced in the reflection hologram than in the transmission hologram. Therefore, increase in the spot diameter due to the wavelength dispersion is inhibited. The reflection hologram has better wavelength selectivity than the transmission hologram. On the other hand, the transmission hologram has better angle selectivity (the wavelength is constant) than the reflection hologram.

Third Embodiment

The LED print head according to a third embodiment has the same configuration as that of the image-forming apparatus and the LED print head according to the first embodiment, except that each of the plural light-collecting devices 54 is on-chip formed on the LED substrate 58. Therefore, the same reference numeral is given to the same component and the description thereof is omitted. The light-collecting device 54 is composed of a pair of transmission holograms. FIG. 10A is a view showing an example of the method of forming the light-collecting device (a pair of volume holograms) in the hologram recording layer.

As shown in FIG. 10A, the LED array 52 obtained by mounting the plural LEDs 50 on the LED substrate 58 is prepared. The hologram recording layer 60A is formed of the photopolymer or the like on the LED substrate 58. As shown in FIG. 10A, the light-collecting device 54 is formed by the interference of the three light waves (coherent lights).

The spherical wave, which passes through the light path of the diffracted light forming an image on the surface 12A in an opposite direction, is applied to the hologram recording layer 60A as the "first light wave". Also, the spherical wave, which passes through the light path of the converging light converging from a desired hologram diameter $r_H$ to the light-emitting point when passing through the hologram recording laser 60A, is applied to the hologram recording layer 60A as the "second light wave". Simultaneously, the planar wave, which intersects with the first light wave and the second light wave in the hologram recording layer 60A, is applied to the hologram recording layer 60A as the "third light wave".

As in the case of the first embodiment, the first light wave (spherical wave), the second light wave (spherical wave) and the third light wave (planar wave) are applied to the hologram recording layer 60A from the same side. However, unlike in the case of the first embodiment, the first, second and third light waves are applied from the front surface side of the hologram recording layer 60A. The interference pattern (intensity distribution) obtained by the interference of the three light waves is recorded in the thickness direction of the hologram recording layer 60A.

As shown in FIG. 10B, the conical volume hologram 54S is formed by the interference of the second and third light waves. The truncatedly conical volume hologram 54A is formed by the interference of the first and third light waves. Thereby, the hologram recording layer 60 in which a pair of transmission holograms are formed is obtained.

The light-collecting device array 56 formed of the plural light-collecting devices 54 is formed in the hologram recording layer 60A formed on the LED substrate 58 on which the LED array 52 is mounted. Thereby, the LPH 14 obtained by integrating the LED array 52 and the light-collecting device array 56 is fabricated (refer to FIG. 3). By on-chip fabricating the plural light-collecting devices 54 in the hologram recording layer 60A formed on the LED substrate 58 in advance, an emission angle shift of each light-collecting device 54 is absorbed when forming (recording) the hologram.

FIGS. 11A and 11B are views showing the state in which the diffracted light is generated from the light-collecting device. As shown in FIG. 11A, light emission of the LED 50 makes a state substantially the same as that in which the volume hologram 54S is irradiated with the light wave in a direction opposite to the second light wave (refer to FIG. 10) (there is difference in wave front as described in the first embodiment and the second embodiment). A phase conjugate wave (planar wave) of the third light wave is diffracted from the volume hologram 54S by irradiation of the diffused light from the LED 50, and the diffracted planar wave is applied to the volume hologram 54A.

As shown in FIG. 11B, when the planar wave is applied to the volume hologram 54A, the phase conjugate wave (spherical wave) of the first light wave is reproduced from the volume hologram 54A and is emitted as the diffracted light. The emitted diffracted light converges to form an image on the surface 12A of the photoreceptor drum 12 with the operating distance of a few centimeters. The spot 62 is formed on the surface 12A.

As in the case of the first embodiment, the volume holograms 54S and 54A have the high incident angle selectivity and wavelength selectivity. Therefore, the coherence is improved by the filtering function thereof. Therefore, the minute spot is formed from the incoherent light by the two volume holograms 54S and 54A. Also, in this embodiment, the light-collecting device 54 generates the diffracted light by phase conjugate reproduction, so that wave front distortion or the like is canceled, and this contributes to reduce an aberration.

Fourth Embodiment

The LED print head according to a fourth embodiment has the same configuration as that of the image-forming apparatus and the LED print head according to the third embodiment, except that the light-collecting device 54 is composed of a pair of reflection holograms. Therefore, the same reference numeral is given to the same component and the description thereof is omitted. FIG. 12A is a view showing an example of the method of forming the light-collecting device (a pair of volume holograms) in the hologram recording layer.

As shown in FIG. 12A, the LED array 52 obtained by mounting the plural LEDs 50 on the LED substrate 58 is prepared. The hologram recording layer 60A is formed of the photopolymer or the like on the LED substrate 58. As shown in FIG. 12A, the light-collecting device 54 is formed by the interference of the three light waves (coherent lights). As in the case of the third embodiment, the hologram recording layer 60A is irradiated with the first light wave (spherical wave), the second light wave (spherical wave) and the third light wave (planar wave), which are the coherent lights.

The first light wave and the second light wave are applied from the same side (front surface side of the hologram recording layer 60A) to the hologram recording layer 60A. On the other hand, the third light wave is applied from the opposite side (the side on which the LED substrate 58 is arranged) to the hologram recording layer 60A. The interference pattern (intensity distribution) obtained by the interference of the three light waves is recorded in the thickness direction of the hologram recording layer 60A.

Figure 12B:
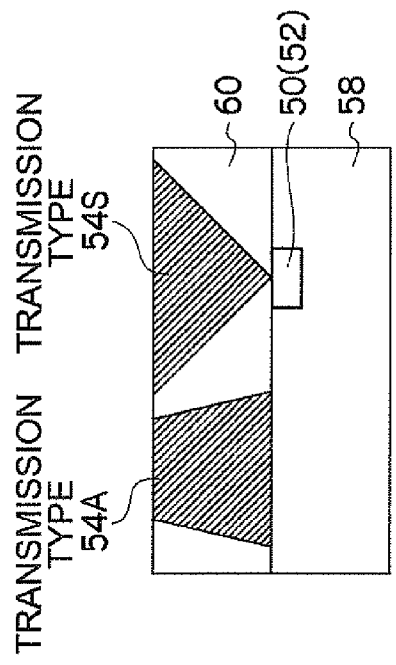
FIG. 12B is a view showing the volume hologram formed in the hologram recording layer.
Figure 12A:
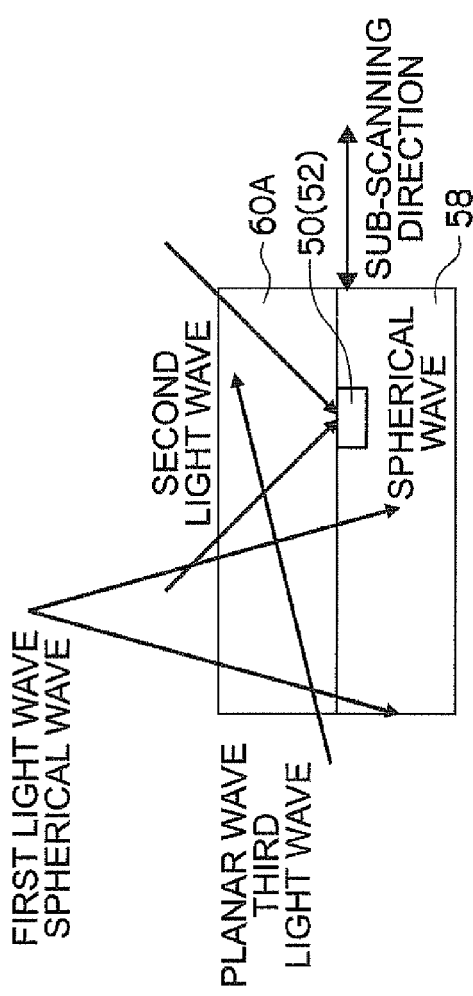
FIG. 12A is a view showing an example of the method of forming a light-collecting device in the hologram recording layer according to a fourth embodiment.

As shown in FIG. 12B, the conical volume hologram 54S is formed by the interference of the second and third light waves. The truncatedly conical volume hologram 54A is formed by the interference of the first and third light waves. Thereby, the hologram recording layer 60 in which a pair of reflection holograms are formed is obtained.

The LHP 14 obtained by integrating the LED array 52 and the light-collecting device array 56 is fabricated by forming the light-collecting device array 56 formed of the plural light-collecting devices 54 in the hologram recording layer 60A formed on the LED substrate 58 on which the LED array 52 is mounted (refer to FIG. 2). By on-chip fabricating the plural light-collecting devices 54 in the hologram recording layer 60A formed on the LED substrate 58 in advance, the emission angle shift of each light-collecting device 54 is absorbed when forming (recording) the hologram.

Figure 13A:
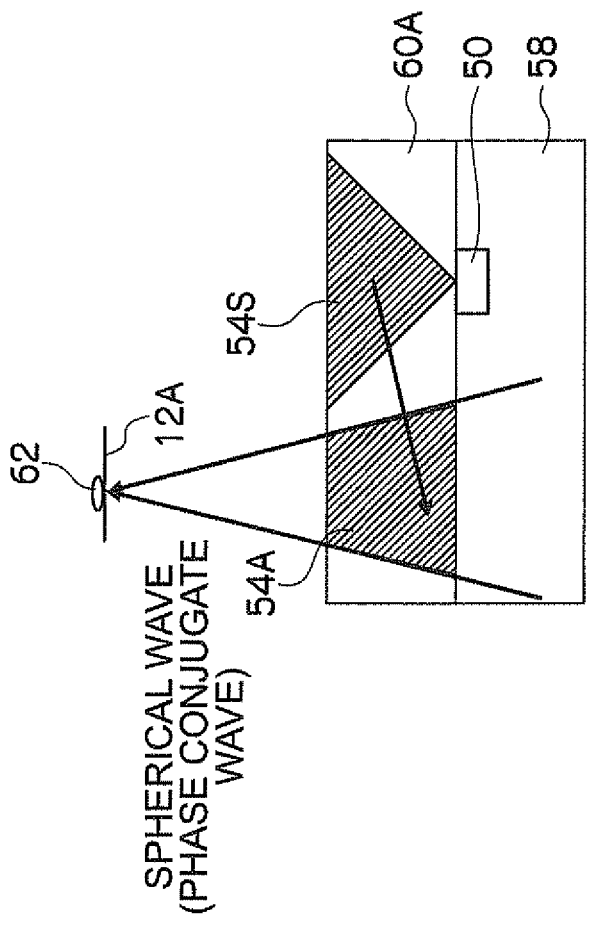
FIGS. 13A and 13B are views showing the state in which the diffracted light is generated from the light-collecting device.
Figure 13B:
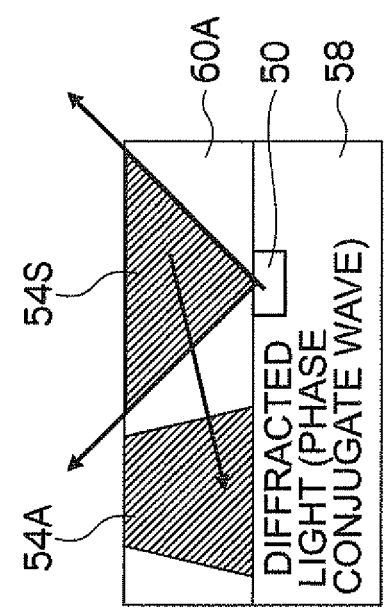

FIGS. 13A and 13B are views showing the state in which the diffracted light is generated from the light-collecting device. As shown in FIG. 13A, the light emission of the LED 50 makes the state substantially the same as that in which the volume hologram 54S is irradiated with the light wave in the direction opposite to that of the second light wave (refer to FIG. 12) (as described in the first embodiment and the second embodiment, there is the difference in the wave front). By the irradiation of the diffused light from the LED 50, the phase conjugate wave (planar wave) of the third light wave is diffracted from the volume hologram 54S, and the diffracted planar wave is applied to the volume hologram 54S.

As shown in FIG. 13B, when the planar wave is applied to the volume hologram 54A, the phase conjugate wave (spherical wave) of the first light wave is reproduced from the volume hologram 54A and is emitted as the diffracted light. The emitted diffracted light converges to form an image on the surface 12A of the photoreceptor drum 12 with the operating distance of a few centimeters. The spot 62 is formed on the surface 12A.

As in the case of the first embodiment, the volume holograms 54S and 54A have the high incident angle selectivity and wavelength selectivity. Therefore, the coherence is improved by the filtering function thereof. Therefore, the minute spot is formed from the incoherent light by the two volume holograms 54S and 54A. Also, as in the case of the second embodiment, there is the advantage of the reflection hologram. Also, as in the case of the third embodiment, since the light-collecting device 54 generates the diffracted light by the phase conjugate reproduction, the wave front distortion or the like is canceled, and this contributes to reduce the aberration.

Meanwhile, the LED print head provided with the plural LEDs is described in the above-described embodiment. However, another light-emitting device such as LD and EL may be used in place of the LED. By designing the light-collecting device according to the characteristics of the light-emitting device, the minute spot with the clear contour is formed as in the case in which the LD, which emits the coherent light, is used as the light-emitting device, even when the LED and the EL, which emit the incoherent light, are used as the light-emitting device.

Also, the example in which the plural volume holograms are multiply-recorded by the multiple spherical wave shift method and the multiple angle method is described in the above-described embodiment. However, the plural hologram devices may be multiply-recorded by another multiple method as long as this is the multiple method with which the desired diffracted light may be obtained. Also, the plural kinds of multiple methods may be used in combination. As another multiple method, there are angle multiply-recording to record while changing the incident angle of reference light, wavelength multiply-recording to record while changing the wavelength of the reference light, phase multiply-recording to record while changing a phase of the reference light, and the like. When the multiply-recording is possible, separate diffracted lights are reproduced from plural multiply-recorded holograms without the cross talk.

Also, in the above-described embodiment, the image-forming apparatus is the tandem-type digital color printer, and it is described about the LED print head as the exposure device for exposing the photoreceptor drum of each image-forming unit. However, the image-forming apparatus for forming an image by imagewise exposing a photosensitive image recording medium by the exposure device may be used, and this is not limited to the above-described embodiment. For example, the image-forming apparatus is not limited to the digital color printer. In addition, the exposure device of the present invention may be mounted as an optically-coupled device such as an optical fiber. Also, the photosensitive image recording medium is not limited to the photoreceptor drum. The exposure device of the present invention may be applied to the exposure of a silver salt film.

What is claimed is:

1. A light-collecting device, comprising:
   a first volume hologram recorded in a hologram recording layer by interference of a first spherical wave and a planar wave, the first spherical wave passing through a light path of diffused light which radiates from a light incident point positioned on a back surface of the hologram recording layer, passes through the hologram recording layer and spreads to a predetermined diameter; and
   a second volume hologram recorded in the hologram recording layer by interference of a second spherical wave and the planar wave, the second spherical wave passing through a light path of converging light which radiates from the same side as the first spherical wave, passes through the hologram recording layer and converges at an image-forming point spaced apart from a front surface of the hologram recording layer by a predetermined distance,
   the planar wave intersecting with the first spherical wave and the second spherical wave in the hologram recording layer.

2. The light-collecting device according to claim 1, wherein:
   the first volume hologram is conical with a base surface on a front surface side of the hologram recording layer and converging toward the light incident point; and
   the second volume hologram is truncatedly conical with a lower base on a back surface side of the hologram recording layer and an upper base on the front surface side of the hologram recording layer.

3. The light-collecting device according to claim 1, wherein the first volume hologram and the second volume hologram are transmission holograms.

4. The light-collecting device according to claim 1, wherein the first volume hologram and the second volume hologram are reflection holograms.

5. The light-collecting device according to claim 1, wherein the first volume hologram and the second volume hologram are phase conjugate reproducing holograms.

6. A light-collecting device array comprising:
   a plurality of first volume holograms multiply-recorded in a hologram recording layer with each first volume hologram being recorded by interference of a first spherical wave and a planar wave, the first spherical wave passing through a light path of diffused light which radiates from a light incident point positioned on a back surface of the hologram recording layer, passes through the hologram recording layer and spreads to a predetermined diameter; and
   a plurality of second volume holograms multiply-recorded in the hologram recording layer with each second volume hologram being recorded by interference of a second spherical wave and the planar wave, the second spherical wave passing through a light path of converging light which radiates from the same side as the first spherical wave, passes through the hologram recording layer and converges at an image-forming point spaced apart from a surface of the hologram recording layer by a predetermined distance,
   the planar wave intersecting with the first spherical wave and the second spherical wave in the hologram recording layer.

7. The light-collecting device array according to claim 6, wherein the plurality of first volume holograms and the plurality of second volume holograms are shift multiply-recorded by changing irradiation positions of the first spherical wave, the second spherical wave and the planar wave relative to the hologram recording layer, and angle multiply-recorded by changing an irradiation angle of the planar wave.

8. An exposure device, comprising:
   a light-emitting device array having a long substrate and a plurality of light-emitting devices formed on the substrate, the plurality of light-emitting devices disposed to form at least one line in a length direction of the substrate such that an interval between two adjacent light-emitting devices in the length direction of the substrate is a predetermined first interval; and
   a light-collecting device array to claim 6, including the hologram recording layer arranged on the substrate and a plurality of light-collecting devices formed in the hologram recording layer, the plurality of light-collecting devices formed such that an interval between two adjacent light-collecting devices in the length direction of the hologram recording layer is the first predetermined interval corresponding to each of the plurality of light-emitting devices, and each of the plurality of first volume holograms and the plurality of second volume holograms of the plurality of light-collecting devices is formed into a diameter larger than the predetermined first interval such that each light emitted from each of the plurality of light-emitting devices is diffracted in a direction of a predetermined image-forming plane and is collected by a corresponding light-collecting device.

9. The exposure device according to claim 8, wherein each of the plurality of first volume holograms and the plurality of second volume holograms has a diameter ranging from 1 mm to 10 mm.

10. An image-forming apparatus, comprising:

the exposure device according to claim 8;

a photosensitive image recording medium that records an image by imagewise exposure by the exposure device;

a moving unit that moves the image recording medium relative to the exposure device; and a controller that controls the moving unit such that the image recording medium is sub-scanned in a second direction intersecting with a first direction and controls to light each of the plurality of light-emitting devices, based on image data.

11. A light-collecting device, comprising:

a hologram recording layer having a back surface and a front surface, the back surface defining a light incident point;

a first volume hologram recorded in the hologram recording layer, the first volume hologram being defined by an interference of a first spherical wave and a planar wave, the first spherical wave passing through a light path of diffused light which radiates from the light incident point positioned on the back surface of the hologram recording layer, passes through the hologram recording layer and spreads to a predetermined diameter; and a second volume hologram recorded in the hologram recording layer, the second volume hologram being defined by an interference of a second spherical wave and the planar wave, the second spherical wave passing through a light path of converging light which radiates from a side of the hologram recording layer that is the same as a side from which the first spherical wave radiates, passes through the hologram recording layer and converges at an image-forming point spaced apart from the front surface of the hologram recording layer by a predetermined distance, the planar wave intersecting with the first spherical wave and the second spherical wave in the hologram recording layer.

12. A light-collecting device array comprising:

a hologram recording layer having a back surface and a front surface, the back surface defining a light incident point;

a plurality of first volume holograms multiply-recorded in the hologram recording layer with each first volume hologram being defined by an interference of a first spherical wave and a planar wave, the first spherical wave passing through a light path of diffused light which radiates from the light incident point positioned on the back surface of the hologram recording layer, passes through the hologram recording layer and spreads to a predetermined diameter; and a plurality of second volume holograms multiply-recorded in the hologram recording layer with each second volume hologram being by defined an interference of a second spherical wave and the planar wave, the second spherical wave passing through a light path of converging light which radiates from the a side of the hologram recording layer that is the same as a side from which the first spherical wave radiates, passes through the hologram recording layer and converges at an image-forming point spaced apart from a surface of the hologram recording layer by a predetermined distance, the planar wave intersecting with the first spherical wave and the second spherical wave in the hologram recording layer.

\* \* \* \* \*